United States Patent Office 3,087,946
Patented Apr. 30, 1963

3,087,946
PROCESS FOR BLEACHING REFINED COTTONSEED OIL
Walter A. Pons, Jr., and James C. Kuck, New Orleans, and Vernon L. Frampton, Metairie, La., assignors to the United States of America as represented by the Secretary of Agriculture
No Drawing. Filed Nov. 16, 1961, Ser. No. 152,949
6 Claims. (Cl. 260—424)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a novel bleaching process for the simultaneous removal of the Halphen test response, and lowering or reduction of the oil-soluble yellow, red and green chlorophyll-like pigments from refined cottonseed oil. This invention has as its object the production of bleached oils of light color which are negative to the Halphen test reaction.

A primary objective of the present invention is to provide a novel single stage bleaching process for the simultaneous removal of the Halphen test response, and the reduction in the concentrations of yellow, red and chlorophyll-like pigments from refined cottonseed oil, to produce high quality, sulphur-free bleached oils of light color and which are negative to the Halphen test.

Another objective is to provide a catalytic sulfurous acid treated alumina, or mixtures of sulfurous acid treated and activated alumina, which can be used to provide sulfur-free bleached cottonseed oils of light color, which are negative to the Halphen test, in a practical, single stage bleaching process of short duration.

According to the present invention the catalytic activated alumina is preferably prepared by soaking finely ground activated alumina (400 mesh or finer) in an excess of a saturated aqueous solution of sulfurous acid (1.2–1.7 molar in $H_2SO_3$ depending upon the ambient temperature) at normal ambient temperatures for 0.5–1.0 hour with stirring, in order to saturate the alumina surface with sulfurous acid. An excess of sulfurous acid is present when the supernatant aqueous solution is acidic. The ratio of activated alumina to sulfurous acid solution is preferably about one part by weight of alumina to about ten parts by weight of sulfurous acid solution. Both the time of contact and the sulfurous acid concentration may vary over reasonable limits. The treated alumina is separated from the aqueous acid solution, as by filtration, and dried to a moisture content in the range of 10–17 percent of water.

In the practice of the invention, 100 parts of refined cottonseed oil are mixed with 1–6 parts, preferably 4 parts, of the sulfurous acid treated alumina, or with equivalent concentrations of a mixed adsorbent containing at least 50% by weight of the sulfurous acid treated alumina and the remainder conventional activated alumina, preferably containing equal parts of sulfurous acid treated and conventional activated alumina. The mixture of oil and adsorbent, under high vacuum or an inert atmosphere such as nitrogen, is stirred continuously, heated at a temperature of at least 225° C. for 30–60 minutes, cooled, and the adsorbent removed by filtration.

The process of treating refined cottonseed oil with adsorbents, generally natural clays or fuller's earths, is termed adsorption bleaching, or bleaching, in the industry. Refined oils are bleached for the purpose of removing small amounts of soaps and phosphatides remaining in the refined oil, and for lowering the concentration of oil soluble yellow, red and green chlorophyll-like pigments. For normal refined cottonseed oils, conventional natural bleaching earths are adequate for the removal of easily bleachable yellow pigments and green chlorophyll-like pigments. These adsorbents have been shown to be relatively ineffective for the removal of fixed oil-soluble red pigments which occur in cottonseed oil as a result of complex reactions between the polyphenolic pigment gossypol, a constituent of the cottonseed, and the glycerides, phosphatides and other normally occurring constituents of the seed. These alkali-fast and bleach resistant pigments can be removed substantially completely from refined cottonseed oil by the use of more active adsorbents such as activated alumina [W. A. Pons, Jr., J. C. Kuck and V. L. Frampton, "Bleaching of Off-Color Cottonseed Oils," Journal of the American Oil Chemists' Society, vol. 37, pp. 671, 673, December 1960] [W. A. Pons, Jr., J. C. Kuck and V. L. Frampton, "Process for Bleaching Off Color Cottonseed Oils," Serial No. 49,804, filed August 15, 1960].

While effective for the removal of both easily bleachable yellow pigments and fixed bleach resistant red pigments, normal activated aluminas are relatively ineffective in the removal of the green chlorophyll-like pigments which are found in many refined cottonseed oils. Application of alumina bleaching in the present state of the art, therefore, requires subsequent treatment of alumina bleached oils with activated carbon or natural earth for the removal of these chlorophyll-like pigments which are undesirable in processed cottonseed oils.

Cottonseed oil glycerides, in addition to the major fatty acid constituents such as linoleic, oleic and palmitic acids, contain an estimated 2–3 percent of a physiologically active fatty acid, malvalic acid,

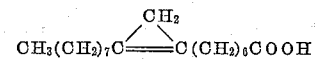

which has recently been isolated and identified as a constituent fatty acid of cottonseed glycerides [T. H. E. Webb, V. L. Frampton, and T. L. Ward, "Isolation and Identification of the Halphen-Positive Fatty Acid in Cottonseed Oil," Journal of the American Chemical Society, In Press]. Malvalic acid responds to the well known Halphen test, developing a red color when treated with a solution of sulfur dissolved in carbon disulfide. A positive Halphen test is characteristic of cottonseed oil, and the seed oils of many malvaceous plants [F. S. Shenstone, and J. R. Vickery, "A Biologically Active Fatty Acid in Malvacae," Nature 177, p. 94, January 1956].

It has been demonstrated that the two known fatty acids which contains the cyclopropene ring, malvalic and sterculic acids, are physiologically active, and are responsible for egg abnormalities such as pink whites, salmon colored, enlarged and fluid yolks, when they are included in the diets of laying hens [F. S. Shenstone, and J. R. Vickery, cited above]. More recently, a direct correlation has been observed between the relative intensity of the Halphen test of the residual oil in cottonseed meals incorporated in the diets of laying hens and the occurrence of pink whites in stored shell eggs [V. L. Frampton, F. L. Carter, B. Piccolo, and B. W. Heywang, "Cottonseed Constituents and Discolorations in Stored Shell Eggs," Journal of Agricultural and Food Chemistry, In Press].

It has further been established that prolonged heating of crude cottonseed oil for about 8 hours at 200° C. under atmospheric conditions removes both the Halphen test response, and the physiological activity of the oils, such as the production of pink egg whites and enlarged yolks [R. J. Evans, S. L. Bandemer, and J. A. Davidson, "Heat Inactivation of Substances in Crude Cottonseed Oil Causing Pink Whites and Large Discolored Yolks in Stored Eggs," Poultry Science, 39, pp. 1478–1483, November 1960]. Such treatments are not practical for edible cottonseed oils since these conditions lead to the production of thermal and oxidative polymers which have been shown to be toxic to experimental animals [E. G. Perkins, "Nutritional and Chemical Changes Occurring in Heated Fats," Food Technology, 14, pp. 508–514 (1960)].

Adsorption bleaching of cottonseed oils is practiced primarily for the purpose of reducing or lowering yellow, red and chlorophyll-type color bodies in the refined oil. The reduction or removal of Halphen test response has in the past not been an objective in the bleaching process. Upon studying these factors of color body removal and Halphen test reduction, we have found that the use of both conventional natural bleaching earth and normal activated alumina of commerce can achieve some of these objectives, but that neither adsorbent can be utilized to achieve all of these objectives. This is illustrated by the experimental data recorded in Table I where a refined commercial cottonseed oil was treated for varying periods of time under the conditions noted in the Table with conventional natural bleaching earth and with activated alumina. Portions of each bleached oil were also subjected to typical deodorization conditions in a laboratory deodorizer. The bleached and deodorized oils were evaluated for total color by means of a Color Index method which has been shown to be highly correlated with visual grading of bleached oil [W. A. Pons, Jr., J. C. Kuck, and V. L. Frampton, "Color Index for Cottonseed Oils," Journal of the American Oil Chemists' Society, 37, pp. 671–673 (1960)]. Chlorophyll content was determined by application of Official Method Cc 13d–55 of the American Oil Chemists' Society. The Halphen test method as described by A. J. Deutchmann and I. S. Klaus, Analytical Chemistry, 32, pp. 1809–1810 (1960), was utilized for the evaluation of the reduction in the Halphen test response. The percentage reduction in Halphen test response was calculated from the ratio of the absorbance per unit weight of the treated and refined oils, as obtained in the analytical procedure.

Analysis of these oils, as reported in Table I, indicates that activated alumina is superior to natural earth for the removal of yellow and red pigments but decidedly inferior insofar as removal of green chlorophyll-like pigments are concerned. Both adsorbents promote a gradual reduction in Halphen test response. The conditions of steam deodorization, 1.0 hr. at 200° C. under vacuum, had surprisingly little effect on further reduction in the Halphen test response. That there is a mild catalytic effect due to the presence of activated alumina, is shown by the fact that the reduction in Halphen test response is greater than that obtained when the refined oil is heated in the absence of alumina for comparable periods of time. All of these oils, however, are positive to the Halphen test.

The catalytic effect of sulfurous acid treated alumina on reduction in the Halphen test response and color reduction is illustrated by the data set forth in Table II. Here it is apparent that a 30 minute bleaching period with sulfurous acid treated alumina, or a 60 minute bleach with a mixed alumina adsorbent, has completely removed the Halphen test response. These bleached oils exhibited an absorbance value in the Halphen method which was actually lower than that found for the corn oil blank which serves as the zero standard in the analytical method. It is also apparent that the sulfurous acid treated alumina brought about a marked lowering of the chlorophyll concentration from 0.91 to 0.13 p.p.m., a 7-fold decrease. Both sulfurous acid treated alumina and the mixed adsorbent containing equal parts of sulfurous acid treated and activated alumina produced bleached oils of lower color than the oils which were bleached with natural earth. These color values, 2.15–2.84, are in the region of desirable color values, since a number of high quality commercial salad oils were found to exhibit color indices ranging from 2.0 to 3.0.

The bleaching temperature is a critical variable influencing the efficiency of sulfurous acid treated alumina adsorbents. The experimental data outlined in Table III indicated that at bleaching temperatures below 225° C., the removal of color bodies from refined cottonseed oil, and the reduction in the Halphen test response of the oil is unsatisfactory. At bleaching temperatures of 225° C., or higher, the oil bleached with sulfurous acid treated alumina is lighter in color, lower in green chlorophyll-like pigments, and negative to the Halphen test.

We have found that the relative proportions of sulfurous acid treated alumina to activated alumina in mixed alumina adsorbents has a marked effect on the rate of reduction in Halphen test response and on color body removal. This is demonstrated by the data recorded in Table IV, where equivalent concentrations of each specified mixed alumina adsorbent were utilized under comparable conditions for the bleaching of a refined cottonseed oil. From these results it may be concluded that the rate of reduction in Halphen test response is greatest when the relative concentration of sulfurous acid treated alumina, in mixed alumina, adsorbents, is 50 percent or more. Within this range of 50–100% of sulfurous acid treated alumina, total bleaching efficiency is good, Halphen test reduction is complete, and chlorophyll removal is substantial.

We have found that treatment of normal activated aluminas with strong acids such as hydrochloric acid or with salts of sulfurous acid or with sodium hydrosulfite were not as effective as the sulfurous acid treated alumina for the simultaneous reduction of Halphen test response, removal of color bodies and chlorophyll-like pigments. From the results of comparable bleaching experiments with several treated aluminas recorded in Table V it can be noted that the bleaching efficiency was greatest for the sulfurous acid treated alumina. Although Halphen test response reduction was complete with alumina treated with sodium bisulfite or sodium sulfite, bleaching efficiency and chlorophyll pigment removal was not as complete as that found with sulfurous acid treated aluminas. Strong acid, such as hydrochloric acid, in addition to unsatisfactory reduction in Halphen test response and color reduction, is not desirable due to the hydrolysis of triglycerides under the bleaching conditions.

We have also found that the bleaching of refined cottonseed oil with sulfurous acid treated alumina, or with mixtures of sulfurous acid treated and activated alumina, produced bleached oils which were completely free of combined sulfur. We have also found that treatment of refined cottonseed oil with gaseous sulfur dioxide removes the Halphen test response, but the treated oils contain combined sulfur which is not removed in the deodorization process. In a typical experiment sulfur dioxide gas was bubbled through a refined cottonseed oil for 30 minutes under normal atmospheric conditions, after which the oil was de-gassed for 2 hours under vacuum to remove excess sulfur dioxide, and then steam deodorized for 1 hour at 200° C. under vacuum. Separate portions of the same refined oil were also bleached with 4 percent of sulfurous acid treated alumina for 30 minutes at 225° C. under vacuum, and with 4 percent of a mixed alumina adsorbent composed of equal parts of sulfurous acid treated and normal activated alumina, for 60 minutes at 225° C. under vacuum. Both alumina bleached oils were also deodorized for 1 hour at 200° C. under vacuum. Ten gram samples of the original refined oil, both alumina bleached oils, and the sulfur dioxide treated oil were ashed with the aid of alcoholic magnesium nitrate and nitric acid to destroy organic matter, following which combined sulfur was determined by gravimetric precipitation as barium sulfate. These determinations showed that the original refined oil, and both alumina bleached oils were completely free of sulfur. The oil treated with sulfur dioxide contained 0.054 percent of total sulfur. Combined sulfur is undesirable in edible oils, since mere trace quantities of sulfur compounds are known to be catalyst poisons in the hydrogenation process for hardening vegetable oils. The addition of combined sulfur to edible oils also produces unnatural glycerides which may have deleterious physiological effects.

Analysis of both of the alumina bleached oils, and the sulfur dioxide treated oil by application of the previously outlined Halphen test method, showed that each oil was negative to the Halphen test. It may be noted, however, that in the case of the oil bleached with sulfurous acid treated alumina, the complete removal of the Halphen test response did not involve the addition of combined sulfur to the oil.

The following examples illustrate the practice of the invention:

EXAMPLE 1

Commercial activated alumina was ground in a ball mill, and screened to pass a 400 mesh sieve. The ground alumina was soaked in a 1.2 molar solution of sulfurous acid, using a ratio of one part of alumina to 10 parts of sulfurous acid, for thirty minutes. The alumina was recovered by filtration, and the treated alumina was air equilibrated to a moisture content of 15.0%.

To 100 parts by weight of a fresh sample of commercially produced refined, water washed and vacuum dried cottonseed oil were added 4 parts of the sulfurous acid treated alumina. The mixture of oil and adsorbent, in a suitable container, was stirred continuously, the container was evacuated to 1 mm. pressure, the temperature of the mixture was raised to 225° C., and maintained at this temperature for thirty minutes. The mixture was then cooled to 75° C., and the adsorbent removed by filtration. The color index, reduction in Halphen test response as compared to the original refined oil, and the chlorophyll content of the filtered bleach oil were determined by the methods previously stated.

For comparison purposes, the refined oil was also bleached with 4 percent of Official Natural Bleaching Earth of the American Oil Chemists' Society, utilizing a 30 minute bleaching period at 120° C.

| Type of oil | Color index ×10⁻¹ | Percent reduction in Halphen test | Chlorophyll p.p.m. |
|---|---|---|---|
| Refined oil | 17.2 | 0.0 | 0.91 |
| Bleached with natural earth | 3.8 | 54.4 | 0.004 |
| Bleached with H₂SO₃ treated alumina | 2.8 | 100.0 | 0.13 |

It is evident that bleaching a typical refined cottonseed oil with sulfurous acid treated alumina produced a bleached oil of lighter color than that obtained by use of natural bleaching earth, and an oil completely free of Halphen test response. There was also a substantial reduction in the concentration of green chlorophyll-like pigments.

EXAMPLE 2

Sulfurous acid treated alumina was prepared as outlined under Example 1. Equal parts of the sulfurous acid treated alumina and of the original finely ground activated alumina were intimately mixed by tumbling, to prepare a mixed alumina adsorbent.

To 100 parts of the same refined oil employed in Example 1 were added 4 parts of the mixed alumina adsorbent. The oil was bleached as outlined under Example 1, with the exception that the bleaching time at 225° C. was maintained for 60 minutes. The bleach color, reduction in Halphen test response, and chlorophyll content were determined as outlined in Example 1.

| Type of oil | Color index ×10⁻¹ | Percent reduction in Halphen test | Chlorophyll p.p.m. |
|---|---|---|---|
| Refined oil | 17.2 | 0.0 | 0.91 |
| Bleached with natural earth | 3.8 | 54.4 | 0.004 |
| Bleached with mixed alumina absorbent | 2.1 | 100.0 | 0.20 |

The use of a mixed alumina adsorbent composed of equal parts of sulfurous acid treated and activated alumina for the bleaching of a commercial refined cottonseeed oil produced a bleached oil which was completely free of Halphen test response, and substantially lighter than the oil which was bleached with natural earth. There was about a 5-fold reduction in the concentration of green chlorophyll-like pigments.

Table I

COMPARISON OF ADSORBENTS FOR REDUCTION OF COLOR, HALPHEN RESPONSE AND CHLOROPHYLL IN REFINED COTTONSEED OIL

| Treatment of oil | Bleaching conditions | | | Color index ×10⁻¹ | Percent reduction in Halphen test | Chlorophyll, p.p.m. |
|---|---|---|---|---|---|---|
| | Adsorbent, percent | Temp., °C. | Time, min. | | | |
| Refined oil, control | None | None | None | 17.22 | 0.0 | 0.91 |
| BLEACHED OILS | | | | | | |
| Natural earth | 4.67 | 120 | 30 | 3.80 | 54.4 | 0.004 |
| Activated alumina | 4.0 | 225 | 5 | 3.62 | 14.2 | 0.83 |
| Do | 4.0 | 225 | 15 | 2.74 | 6.7 | 0.70 |
| Do | 4.0 | 225 | 30 | 2.16 | 18.1 | 0.73 |
| Do | 4.0 | 225 | 60 | 2.08 | 67.3 | 0.66 |
| Do | 4.0 | 225 | 120 | 2.21 | 96.7 | 0.58 |
| Do | 4.0 | 225 | 180 | 1.93 | 98.1 | 0.58 |
| DEODORIZED OILS [1] | | | | | | |
| Natural earth | 4.67 | 120 | 30 | 3.66 | 71.2 | 0.0 |
| Activated alumina | 4.0 | 225 | 5 | 2.24 | 21.2 | 0.81 |
| Do | 4.0 | 225 | 15 | 2.16 | 0.2 | 0.74 |
| Do | 4.0 | 225 | 30 | 2.10 | 40.3 | 0.73 |
| Do | 4.0 | 225 | 60 | 2.00 | 75.7 | 0.68 |
| HEATED OIL [2] | | | | | | |
| Refined oil | None | 225 | 60 | 4.92 | 65.6 | 0.26 |
| Do | None | 225 | 120 | 4.36 | 88.5 | 0.23 |
| Do | None | 225 | 180 | 4.40 | 95.8 | 0.37 |

[1] Bleached oils steam deodorized 1 hour at 220° C. under vacuum.
[2] Refined oil only, heated in vacuum (1 mm.).

Table II

COMPARISON OF TREATED ADSORBENTS FOR BLEACHING COTTONSEED OIL

| Adsorbent | Bleaching conditions | | | Color index ×10⁻¹ | Percent reduction in Halphen test | Chlorophyll, p.p.m. |
|---|---|---|---|---|---|---|
| | Adsorbent, percent | Temp., °C. | Time, min. | | | |
| Refined oil | None | None | None | 17.22 | 0.0 | 0.91 |
| H₂SO₃ treated natural earth [1] | 4.67 | 120 | 30 | 4.16 | 91.0 | 0.02 |
| H₂SO₃ treated alumina | 4.0 | 225 | 5 | 3.36 | 88.2 | 0.10 |
| Do | 4.0 | 225 | 15 | 3.14 | 92.2 | 0.12 |
| Do | 4.0 | 225 | 30 | 2.80 | 100.0 | 0.13 |
| Do | 4.0 | 225 | 60 | 2.84 | 100.0 | 0.13 |
| Mixed alumina adsorbent [2] | 4.0 | 225 | 15 | 2.53 | 95.1 | 0.19 |
| Do | 4.0 | 225 | 30 | 2.15 | 97.3 | 0.19 |
| Do | 4.0 | 225 | 60 | 2.53 | 100.0 | 0.20 |

[1] A.O.C.S. natural bleaching earth soaked in excess of saturated aqueous sulfurous acid, dried.
[2] Equal parts of sulfurous acid treated alumina and normal activated alumina.

Table III
EFFECT OF BLEACHING TEMPERATURE ON THE BLEACHING EFFICIENCY OF SULFUROUS ACID TREATED ALUMINA ADSORBENT

| Adsorbent | Bleaching conditions [1] | | | Color index ×10⁻¹ | Percent reduction in Halphen test | Chlorophyll, p.p.m. |
| --- | --- | --- | --- | --- | --- | --- |
| | Adsorbent, percent | Temp., °C. | Time, min. | | | |
| H₂SO₃ treated alumina | 4.0 | 125 | 30 | 10.22 | 26.5 | 0.17 |
| Do | 4.0 | 150 | 30 | 8.95 | 30.3 | 0.27 |
| Do | 4.0 | 175 | 30 | 7.59 | 47.3 | 0.24 |
| Do | 4.0 | 225 | 30 | 2.65 | 100.0 | 0.13 |

[1] Refined cottonseed oil, with color index of 17.22 and containing 0.91 p.p.m. of chlorophyll, bleached under vacuum (1 mm.).

Table IV
BLEACHING EFFICIENCY OF MIXED ALUMINA ADSORBENTS

| Composition of mixed alumina adsorbent [1] | | Color index ×10⁻¹ | Percent reduction in Halphen test | Chlorophyll, p.p.m. |
| --- | --- | --- | --- | --- |
| Activated alumina, percent | H₂SO₃ treated alumina, percent | | | |
| None [2] | None [2] | 17.22 | 0.0 | 0.91 |
| 100 | 0 | 2.16 | 18.1 | 0.73 |
| 90 | 10 | 2.26 | 76.0 | 0.34 |
| 75 | 25 | 2.33 | 96.4 | 0.27 |
| 50 | 50 | 2.15 | 97.3 | 0.19 |
| 50 | 50 [3] | 2.53 | 100.0 | 0.20 |
| 0 | 100 | 2.80 | 100.0 | 0.13 |

[1] Each adsorbent used at 4% concentration at 225° C., under vacuum (1 mm.), for 30 minutes.
[2] Refined oil used for bleaching tests.
[3] 60 minute bleach.

Table V
BLEACHING EFFICIENCY OF SEVERAL TREATED ALUMINA ADSORBENTS

| Type of treated alumina adsorbent | Color index ×10⁻¹ | Percent reduction in Halphen test, percent | Chlorophyll, p.p.m. |
| --- | --- | --- | --- |
| Refined oil | 17.22 | --- | 0.91 |
| TREATED ALUMINAS [a] | | | |
| H₂SO₄ [b] | 2.80 | 100.0 | 0.13 |
| HCl [c] | 3.10 | 98.6 | 0.004 |
| NA₂SO₃ [d] | 3.39 | 100.0 | 0.66 |
| NaHSO₄ [d] | 3.40 | 100.0 | 0.24 |
| Na hydrosulfite [d] | 3.20 | 82.4 | 0.19 |

[a] Each treated adsorbent utilized at 4% concentration at 225° C. for 30 minutes under vacuum (1 mm.) to bleach a refined cottonseed oil.
[b] Treated with saturated sulfurous acid.
[c] Treated with 5% solution of hydrochloric acid.
[d] Treated with 5% solution of respective salt.

We claim:

1. A process for treating refined cottonseed oil to effect bleaching thereof and to remove entirely the Halphen test response therefrom, comprising heating a mixture containing sulfurous acid saturated activated alumina and refined cottonseed oil in the proportion of about from 1 to 6 parts, by weight, of the alumina per 100 parts, by weight, of the cottonseed oil at a temperature of at least 225° C. for from 30 to 60 minutes, and separating the resulting bleached oil from the alumina.

2. The process of claim 1 wherein the sulfurous acid saturated activated alumina and refined cottonseed oil are used in the proportion of about 4 parts per 100 parts, respectively, and the mixture containing them heated at a temperature of 225° C.

3. A process for treating refined cottonseed oil to effect bleaching thereof and to remove entirely the Halphen test response therefrom, comprising heating a mixture containing an activated alumina adsorbent and refined cottonseed oil in the proportion of about from 1 to 6 parts, by weight, of the activated alumina adsorbent per 100 parts, by weight, of the cottonseed oil, said activated alumina adsorbent comprising at least 50%, by weight, of sulfurous acid saturated activated alumina, at a temperature of at least 225° C., for from 30 to 60 minutes, and separating the resulting bleached oil from the alumina.

4. The process of claim 3 wherein the activated alumina adsorbent comprises about equal parts of activated alumina and sulfurous acid saturated activated alumina.

5. A process for treating refined cottonseed oil to effect bleaching thereof and to remove entirely the Halphen test response therefrom, comprising forming a mixture containing sulfurous acid saturated activated alumina and refined cottonseed oil in the proportion of about from 1 to 6 parts, by weight, of the alumina per 100 parts, by weight, of the cottonseed oil, said sulfurous acid saturated activated alumina having been prepared by (a) soaking activated alumina, ground to pass at least a four hundred mesh sieve, in a 1.2 to 1.7 molar aqueous solution of sulfurous acid until the alumina surface is saturated with respect to sulfurous acid, as indicated by the acidic reaction of the supernatant solution, the ratio of the activated alumina to the sulfurous acid being about one part, by weight, of alumina to about ten parts, by weight, of sulfurous acid solution, (b) separating the soaked sulfurous acid saturated alumina from the aqueous acid solution, and (c) drying the resulting alumina product to a moisture content of about from 10% to 17%; heating the mixture containing the sulfurous acid saturated activated alumina and the refined cottonseed oil at a temperature of at least 225° C. for from 30 to 60 minutes; and separating the resulting bleached cottonseed oil from the alumina.

6. A process for treating refined cottonseed oil to effect bleaching thereof and to remove entirely the Halphen test response therefrom, comprising forming a mixture containing an activated alumina adsorbent and refined cottonseed oil in the proportion of about from 1 to 6 parts, by weight of the activated alumina adsorbent per 100 parts, by weight of the cottonseed oil, said activated alumina adsorbent comprising at least 50%, by weight, of sulfurous acid saturated activated alumina, said sulfurous acid saturated activated alumina having been prepared by (a) soaking activated alumina, ground to pass at least a four hundred mesh sieve, in a 1.2 to 1.7 molar aqueous solution of sulfurous acid until the alumina surface is saturated with respect to sulfurous acid, as indicated by the acidic reaction of the supernatant solution, the ratio of the activated alumina to the sulfurous acid being about one part, by weight, of alumina to about ten parts, by weight, of sulfurous acid solution, (b) separating the soaked sulfurous acid saturated alumina from the aqueous acid solution, and (c) drying the resulting alumina product to a moisture content of about from 10% to 17%; heating the mixture containing the activated alumina adsorbent and the refined cottonseed oil at a temperature of at least 225° C. for from 30 to 60 minutes; and separating the resulting bleached cottonseed oil from the alumina adsorbent.

References Cited in the file of this patent

UNITED STATES PATENTS

| | | |
| --- | --- | --- |
| 2,458,554 | Bolley et al. | Jan. 11, 1949 |
| 2,524,056 | Jespersen | Oct. 3, 1950 |
| 2,595,416 | Schmerling | May 6, 1952 |
| 2,643,935 | Halversen | June 30, 1953 |
| 2,781,301 | Payne | Feb. 12, 1957 |
| 2,795,595 | Elston et al. | June 11, 1957 |
| 2,842,577 | Stern et al. | July 8, 1958 |

OTHER REFERENCES

Stout et al.: "J. Am. Chem. Soc.," vol. 26, pages 120–126 (1949).